United States Patent [19]

Hartry

[11] 4,308,782

[45] Jan. 5, 1982

[54] LAMINATED HEAD OF PLASTIC SHEET MATERIAL AND A SYNTHETIC FABRIC MATERIAL HAVING RANDOM FIBER ORIENTATION

[75] Inventor: Donald R. Hartry, La Canada, Calif.

[73] Assignee: Remo, Incorporated, North Hollywood, Calif.

[21] Appl. No.: 81,844

[22] Filed: Oct. 4, 1979

[51] Int. Cl.³ .................. G10D 13/02; B32B 3/02; B32B 5/02; B32B 7/02

[52] U.S. Cl. .................. 84/414; 428/64; 428/214; 428/215; 428/219; 428/285; 428/286; 428/287; 428/290; 428/910

[58] Field of Search .................. 84/414; 428/910, 310, 428/311, 315, 268, 290, 64, 66, 213, 219, 220, 285, 286, 287, 288, 215, 214

[56] References Cited

U.S. PATENT DOCUMENTS

| | | | |
|---|---|---|---|
| 233,604 | 10/1880 | Deutsch et al. | 84/414 |
| 627,766 | 6/1899 | Wilken | 84/414 |
| 729,936 | 6/1903 | Heybeck | 84/414 |
| 1,018,767 | 2/1912 | Logan | 84/414 |
| 1,116,237 | 11/1914 | Burrell | 84/414 |
| 1,301,955 | 4/1919 | McKechnie | 428/248 |
| 1,523,814 | 1/1925 | Lindsay | 428/260 |
| 1,567,556 | 12/1925 | Trenckmann et al. | 428/284 |
| 1,809,050 | 6/1931 | Logan | 84/414 |
| 2,018,182 | 10/1935 | Logan | 84/414 |
| 2,060,665 | 11/1936 | Durrant | 428/274 |
| 2,110,029 | 3/1938 | Shastock | 8/118 |
| 2,112,544 | 3/1938 | Rick | 428/284 |
| 2,171,505 | 8/1939 | Klinkenstein | 428/249 |
| 2,444,089 | 6/1948 | Bell et al. | 428/230 |
| 2,500,598 | 3/1950 | Axelrod | 264/229 |
| 2,655,071 | 10/1953 | Levay | 84/422 R |
| 2,667,098 | 1/1954 | McMullen | 84/414 |
| 3,088,469 | 5/1963 | Berryhill et al. | 132/9 |
| 3,285,117 | 11/1966 | Cheslow | 84/414 |
| 3,311,690 | 3/1967 | Fischer | 264/278 |
| 3,368,932 | 2/1968 | Weill et al. | 156/497 |
| 3,425,309 | 2/1969 | Elzas et al. | 84/414 |
| 3,472,715 | 10/1969 | Weinbrenner et al. | 156/125 |
| 3,473,196 | 10/1969 | Hull et al. | 425/160 |
| 3,531,367 | 9/1970 | Karsten | 428/315 |
| 3,542,638 | 11/1970 | Kenny | 428/311 |
| 3,647,931 | 3/1972 | Koishikawa | 84/414 |
| 3,668,296 | 6/1972 | Criscuolo | 84/414 |
| 3,932,682 | 1/1976 | Loft et al. | 428/910 |
| 3,948,702 | 4/1976 | Theissen | 428/260 |
| 3,950,206 | 4/1976 | Adachi et al. | 428/910 |
| 3,955,024 | 5/1976 | Goldman et al. | 428/268 |
| 3,962,512 | 1/1976 | Fontana et al. | 428/310 |
| 3,989,789 | 11/1976 | Brookhart | 264/136 |
| 4,010,306 | 3/1977 | Fagan | 428/286 |
| 4,020,209 | 4/1977 | Yuan | 428/268 |
| 4,044,180 | 8/1977 | Baker | 428/287 |
| 4,112,168 | 9/1978 | Schafft | 428/288 |
| 4,125,663 | 11/1978 | Eckardt | 428/290 |

OTHER PUBLICATIONS

Dupont Bulletin, TK-3, "Properties and Processing of TYVEK Spunbonded Olefin,", Dec. 1978.

Primary Examiner—William J. Van Balen
Attorney, Agent, or Firm—Lyon & Lyon

[57] ABSTRACT

A head for a drum or similar musical instrument comprising a synthetic plastic sheet material and a synthetic fabric material having a random fiber orientation which is laminated thereto. The synthetic plastic sheet material remains the primary tension load carrier while the fabric material having nonorientated fibers is laminated thereto to distribute load without transferring stress into the plastic sheet material, thereby reducing the tendency of the plastic sheet material to dent as well as damping undesirable overtones, and to provide an improved brush surface. The synthetic fabric material is preferably impregnated with a water-based resin emulsion system to insure that the nonorientated individual fibers are elastomerically bonded together, thereby increasing the fabric materials' intralaminar integrity and to further enhance the tone quality of the laminated head. Lamination and impregnation in this manner provides a laminated head having an improved sound by increasing resonance and projection with a reduction of harmonic dissonance and provides a playing surface having improved brush response, thereby also resulting in improved brush sound.

22 Claims, 2 Drawing Figures

LAMINATED HEAD OF PLASTIC SHEET MATERIAL AND A SYNTHETIC FABRIC MATERIAL HAVING RANDOM FIBER ORIENTATION

BACKGROUND OF THE INVENTION

1. Field of the Invention

The present invention is directed to a head for a drum or similar musical instrument which provides a playing surface having an improved response for the use of brushes and the like as well as improved sound. More specifically, the laminated head of the present invention comprises a synthetic fabric material having random fiber orientation which is laminated to a synthetic plastic sheet material.

2. Description of the Prior Art

Various types of heads for drums and similar musical instruments have long been known in the art. Initially, heads were manufactured from natural skins, such as calfskin, or were woven from natural fibers, such as cotton. More recently, heads have been manufactured from various synthetic materials in efforts to overcome problems, such as moisture and temperature sensitivity, which are inherent in heads manufactured from natural materials. However, synthetic plastic materials typically have playing surfaces which are too slippery for brushes or the like, and thus are limited in their use.

Moreover, a further problem encountered in the art in the use of conventional heads is the tendency of heads employing ployester films to deform in the playing area as a result of a drumstick or similar instrument striking the surface and thereby elongating, or stretching, the polyester film. Thus, over a period of time, dents form in the playing area and these head gradually lose their tonal quality.

Also well known in the art are heads manufactured from natural or synthetic woven fabrics which are sprayed or coated on one or both sides with an adhesive or similar resin composition, as well as laminated drumheads employing woven fabric materials and an adhesive resin composition in the lamination process. See, for example, Criscuolo, U.S. Pat. No. 3,668,296; Elzas, U.S. Pat. No. 3,425,309; Logan, U.S. Pat. No. 1,809,050; and Heybeck, U.S. Pat. No. 729,936. In particular, a paint coating has been applied to conventional synthetic heads to provide a brushing surface, but the paint gradually wears away through use as a result of its low wearing ability. In addition, since woven fabrics contain orientated fibers they present a uniform surface having a regular series of "bumps", or slight projections and depressions, which cause a brush to vibrate and to produce an undesirable high frequency tone or "whistle".

An examination of the prior art therefore discloses the need for a head for a drum or similar musical instrument having a playing surface which provides improved response when used with brushes or the like, as well as an improved sound.

SUMMARY OF THE INVENTION

The present invention provides a head for a drum or similar musical instrument comprising a synthetic fabric material having random fiber orientation which is laminated to a synthetic plastic sheet material. The plastic sheet material remains the primary tension load carrier while the fabric material having nonorientated fibers is laminated thereto to distribute load without transferring stress into the plastic sheet material, thereby reducing the tendency of the plastic sheet material to dent as well as damping undesirable overtones, and to provide an improved brush surface. Suitable synthetic fabric materials include spunbonded olefin fabric materials, such as TYVEK ®; NOMEX ®; and certain fiberglass fabrics having a random fiber orientation. A suitable synthetic plastic sheet material is MYLAR ®. The synthetic fabric is preferably impregnated with a resin composition to insure that the nonorientated individual fibers are elastomerically bonded together, thereby increasing the fabric materials' intralaminar integrity, and to further enhance the tonal quality of the laminated head.

The adhesive resin composition used in the lamination process preferably has a tensile strength and elongation similar to that of the fabric material to keep stress from transferring into the plastic sheet material and to enhance the improved tonal qualities of the laminated head. Moreover, the adhesive must provide sufficient bond strength between the fabric material and the plastic sheet material to prevent delamination. The laminated head is preferably impregnated subsequent to the lamination process with a different resin composition to avoid any melting of the fabric material when hot melt adhesives are used in the lamination process. Accordingly, an elastomeric high density polyolefin adhesive having a high molecular weight as well as a high viscosity to reduce its mobility, thereby hindering its impregnation of the fabric material, is preferred. The temperature, pressure and rate of the lamination process are controlled to further regulate the flow of the adhesive resin composition, and consequently its impregnation of the fabric material, during the lamination process.

An elastomeric water-based resin emulsion system is preferably used to impregnate the fabric material so as not to transfer stress into the plastic sheet material. Large amounts of wetting agents and alcohol are contained therein and are necessary, together with mechanical work, to wet through, or impregnate the fabric material due to its hydrophobic nature. Excess impregnating resin is removed from the surface of the laminated head so as not to interfere with brush or stick response.

Accordingly, it is an object of this invention to provide a laminated head for a drum or similar musical instrument having an improved sound by increasing resonance and projection with a reduction of harmonic dissonance and a playing surface with improved brush response, resulting in improved brush sound.

It is a further object of this invention to provide a laminated head for a drum or similar musical instrument having a synthetic fabric material having random fiber orientation laminated to a synthetic plastic sheet material to distribute load without transferring stress into the plastic sheet material, thereby reducing its tendency to dent as well as damping undesirable overtones, and to provide an improved brush surface.

It is still another object of this invention to provide a laminated head for a drum or similar musical instrument employing a synthetic fabric material having random fiber orientation which may be impregnated by an elastomeric resin composition to increase the intralaminar integrity of the fabric material and to further enhance the tonal quality of the laminated head.

The manner in which these and other objects and advantages of the invention are achieved will become apparent from the detailed description of the preferred embodiment which follows.

DETAILED DESCRIPTION OF THE INVENTION

Figure 1:
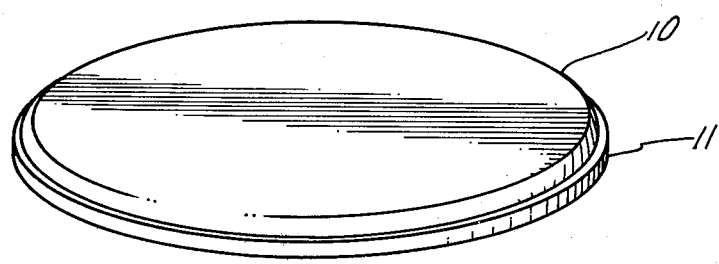
FIG. 1 is a perspective view showing a laminated head of the present invention having a top surface 10 of a synthetic fabric material having a random fiber orientation mounted into hoop 11.
Figure 2:
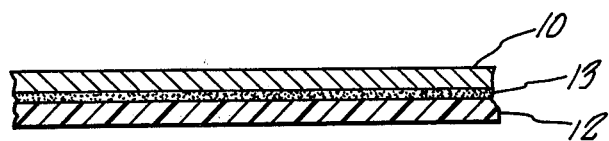
FIG. 2 is a cross-sectional view showing the top surface 10 of a synthetic fabric material layer having a random fiber orientation laminated to a bottom surface 12 of a synthetic plastic sheet material by means of an elastomeric high density polyolefin adhesive 13.

The laminated head of the present invention comprises a synthetic plastic sheet material and a synthetic fabric material having random fiber orientation which is laminated thereto. The plastic sheet material remains the primary tension load carrier while the fabric material having nonorientated fibers is laminated thereto to distribute load without transferring stress into the plastic sheet material, thereby reducing the tendency of the plastic sheet material to dent as well as damping undesirable overtones, and to provide an improved brush surface.

The layer of synthetic plastic sheet material is the primary load carrier for the laminated head, and accordingly, carries most of the tension load. Since the weight of the heads of the present invention are established to avoid the attendant vibration problems inherent in heads of increasing weight, the layer of synthetic plastic sheet material is preferably relatively thin, ranging from about 0.005 to about 0.014 inches in thickness. While the thickness of the plastic sheet material in a drumhead is preferably from about 0.007 to about 0.010 inches, heads for other musical instruments such as bongos, may preferably be thicker. Moreover, while thinner plastic sheets result in a cleaner sound, since the plastic sheet material is the primary load carrier, it must provide sufficient strength for the head. Therefore, layers of synthetic plastic sheet material which are substantially less than 0.005 inches in thickness do not appear to provide sufficient strength.

A particularly preferred synthetic plastic sheet material is the biaxially oriented film of the condensation polymer of ethylene glycol and terephthalic acid. Such a plastic sheet material is produced by E. I. DuPont de Nemours & Co., Inc. under the trademark MYLAR. MYLAR is not susceptible to moisture and changes in the weather, and has good flexibility, durability and tensile strength. However, other synthetic plastic sheet materials may also be successfully used in the practice of the present invention.

The synthetic fabric material having random fiber orientation is a sheet of nonorientated synthetic fibers which are preferably formed into a sheet by spinning strands of very fine, interconnected fibers which have been extruded and then compressing several of the sheets together using only heat and pressure. Thus, the fibers do not form a predetermined, fixed woven pattern, but rather form a random, indeterminate pattern without any orientation of the fibers. Accordingly, this lack of orientation presents a nonuniform playing surface, thereby providing an improved surface for the use of brushes and the like which also improves the brush sound by reducing an undesirable high frequency "whistle".

The fabric material carries very little of the load when the laminated head is tensioned, but provides a "cushioning effect" when struck by a drumstick or similar object by distributing load without transferring stress into the plastic sheet material. Since the fabric material layer is not depended upon to carry load and is not relied upon to add strength or to reinforce the head of the present invention, the fabric layer may be thinner than conventional woven fabrics, thereby reducing the weight of the head. Generally, the fabric material weighs from about 1.0 to about 2.3 oz per square yard and preferably from about 1.3 to about 1.6 oz per square yard. Not all fabrics having a random fiber orientation are currently commercially available in weights below 1.3 ounces per square yard. As a result of the thinness of the fabric layer, the weight gain due to the impregnation of the fabric is minimized, thereby also minimizing the attendant vibration problems of heavier heads. Moreover, by acting as a "cushion" to distribute the force of impact from a stick or similar object which strikes the playing surface, the fabric material reduces the tendency of the sheet of synthetic plastic material to deform and form dents in the playing area, and also damps undesirable overtones.

The fabric material having random fiber orientation is preferably formed from a spunbonded olefin, such as high-density polyethylene fibers. A particularly preferred spunbonded olefin fabric material is produced by E. I. duPont de Nemours & Co., Inc. under the trademark TYVEK. TYVEK has sufficient tack to afford a playing surface very similar to that of natural skins, and presents a playing surface having improved brush response but without the moisture and temperature sensitivity of heads manufactured from natural skins. TYVEK also has good dimensional stability, high resistance to water-borne soiling agents, high tear strength, and high resistance to age degradation, although it must be treated to prevent degradation from ultraviolet rays from sunlight or fluorescent lamps. Laminated heads of the present invention employing TYVEK have also demonstrated superior pull-out resistance from the hoop, thereby enabling such heads to be tensioned to higher levels without separation from the hoop. However, TYVEK is particularly sensitive to many solvents and adhesives, and care must be taken in selecting the adhesive resin composition used in the lamination process as well as in the impregnating resin composition so as not to retard TYVEK's beneficial properties. In addition, it should also be pointed out that other synthetic fabric materials having a random fiber orientation may be successfully used in the practice of the present invention, including NOMEX from E. I. duPont de Nemours & Co., Inc. and certain fiberglass having random fiber orientation. Moreover, as fiberglass has a relatively high specific gravity, laminated heads employing such a fabric tend to weigh more, thereby increasing undesirable vibrations and reducing resonance and projection.

The adhesive resin composition used in the lamination process preferably has a tensile strength and elongation similar to that of the fabric material to keep stress from transferring into the plastic sheet material during tensioning and to further enhance the improved tonal qualities of the laminated head. The adhesive used in the lamination process must provide sufficient bond strength between the fabric material and the plastic sheet material to prevent delamination without melting or otherwise affecting the fabric material. Since most of the adhesive resin compositions known in the art for the lamination of drum heads are hot melt adhesives which have an activation temperature greater than the melting temperatures of the fabric materials having random fiber orientation, the fabric material cannot be wetted through, or impregnated, by the adhesive resin composition employed in the lamination process. Rather the fabric is impregnated subsequent to the lamination process with a different resin composition.

In particular, an elastomeric high density polyolefin adhesive is preferred since it has a high molecular weight, high viscosity and correspondingly low mobility, thereby minimizing its penetration of the fabric material during the lamination process. Such an adhesive melts at elevated temperatures but due to its high viscosity, penetrates only the first layer of fibers in the fabric material. The temperature and pressure of the lamination process are controlled to regulate the flow of the adhesive resin composition, and the rate of the lamination of the synthetic plastic material to the synthetic fabric material is also controlled to further avoid the impregnation of the synthetic fabric. However, the adhesive resin composition used in the lamination process is not limited to merely hot melt adhesives since certain contact adhesives, such as acrylics, contribute to improved tonal qualities. This is particularly important where the laminated heads of the present invention are used on bongos or similar musical instruments. The adhesive resin composition is preferably applied to the synthetic plastic sheet material in thicknesses ranging from 0.001 to 0.006 inches, and a preferred high density polyolefin adhesive can be commercially purchased already applied to MYLAR in these thicknesses, under the name of NAP-LAM from General Binding Corp. in Northbrook, Ill.

The lamination process employed in the manufacture of the heads of the present invention must be conducted at a temperature sufficient to melt the adhesive resin composition without decomposing it, but at any rate less than 400° F., above which is the temperature at which MYLAR, or similar synthetic plastics, burn. The actual temperature of the lamination process is dependent upon the adhesive resin composition actually applied, and is within the knowledge of one having ordinary skill in the art, but will generally vary from about 280° F. to about 360° F., and preferably from about 315° F. to about 325° F. It is important to protect the synthetic fabric material from heat except where it is wetted by the adhesive resin composition since fabrics having a random fiber orientation typically melt at temperatures above 275° F. In this regard, a belt may be used in the lamination process to prevent the fabric material from contacting a heated roller. However, such a protective belt is not required where the adhesive resin composition is melted prior to the nip applying pressure for the lamination, or where the roller contacting the spundbonded olefin material is not heated.

The pressure applied at the nip during the laminating process may also vary, dependent upon the actual materials being used and the desired strength of the bond between the different layers of material, and is similarly within the knowledge of one having ordinary skill in the art, but generally will range from about 4 p.s.i. to about 16 p.s.i., and is preferably about 10 p.s.i. The rate of speed of the rollers which move the different layers through the laminating process will vary from about 3 ft/min to about 4 ft/min and is preferably about 3.5 ft/min in order to further insure that the adhesive resin composition does not impregnate the synthetic woven fabric layer.

After the synthetic fabric material is laminated to the synthetic plastic sheet material, the laminated sheets are preferably passed through a resin bath to impregnate the fabric material. While it is not required to impregnate the fabric material to achieve an improved brush response as well as an improved sound, the impregnating resin composition elastomerically bonds the nonorientated individual fibers of the fabric material together to further increase its intralaminar integrity as well as to further enhance the tone quality of the laminated head by reducing harshness and harmonic dissonance. Since the synthetic fabric material comprises several layers or sheets of fibers which are bonded together only by heat and pressure, the fabric material has a greater tendency to separate into layers if it is not impregnated. The fibers are elastomerically bonded together rather than rigidly bonded so as not to transfer stress into the plastic sheet material and to aid the "cushion" effect by distributing load.

Fabric material having a random fiber orientation is generally hydrophobic in nature, and is extremely sensitive to certain solvents and adhesives, such as ketones and aliphatic hydrocarbons. Therefore, the impregnating resin composition is preferably a water-based resin emulsion system which incorporates relatively large amounts of wetting agents and alcohol, and mechanical work is necessary to impregnate the fabric material. Moreover, it is important to remove the impregnating resin which remains on the surface of the fabric material since the elastomeric properties of any impregnating resin left on the surface detract from brush response and also affect stick response. The surface resin can be removed as the impregnated laminated sheets leave the resin bath by means of a squeege apparatus or similar means known in the art. In addition, at the same time a doctor blade can be employed to remove the impregnating resin from the surface of the synthetic plastic sheet to remove any unnecessary weight. While suitable water-based resin emulsion systems are known to those skilled in the art, a preferred system is Tylac DL 2346 from the Reichhold Corporation in White Plains, N.Y.

A preferred laminated head of the present invention is manufactured from TYVEK 1058D having a weight of about 1.6 oz/sq.yd which is laminated to a sheet of NAP-LAM having a layer of MYLAR which is approximately 0.007 inch thick and a 0.003 inch coating of an elastomeric high density polyethylene adhesive composition on one side. The lamination process takes place at a temperature of about 320° F., a pressure at the nip of about 10 p.s.i. and a roller speed of about 3.5 ft/min. Since TYVEK is also a high density polyethylene, a certain amount of alloying will take place between the TYVEK and the adhesive. While it is believed that this also enhances the improved tonal qualities of the head, the temperature and dwell time at the nip must be controlled to ensure that only the desired amount of alloying takes place. Subsequent to the lamination process, the laminated sheets are passed through a resin bath containing a water based resin emulsion system such as Tylac DL 2346 to impregnate the TYVEK. The excess resin composition is removed from the surface of both the TYVEK and the MYLAR. The laminated head is then mounted upon a hoop using an epoxy glue in the fashion known in the art. An aluminum hoop is preferred due to its rigidity.

The laminated head produced in accordance with the present invention has a playing surface which provides an improved brush response, resulting in improved brush sound, has increased resonance and projection with a reduction of harmonic dissonance, to provide an improved sound, and reduces the tendency of the synthetic plastic sheet to deform and dent by distributing the force of impact of a stick or similar instrument.

While the preferred application of this invention has been shown and described, it would be apparent to those skilled in the art that many more modifications are possible without departing from the inventive concept herein described. The invention, therefore, is to be limited only by the lawful scope of the claims which follow.

I claim:

1. A head for a drum or similar musical instrument comprising a synthetic plastic sheet material laminated to a synthetic fabric material having a random fiber orientation, the plastic sheet material forming the primary tension load carrier.

2. A head as in claim 1 wherein the synthetic plastic sheet material is a biaxially oriented film of the condensation polymer of ethylene glycol and terephthalic acid.

3. A head as in claim 1 wherein the fabric material is a spunbonded olefin.

4. A head as in claim 1 wherein the synthetic fabric material is a high density polyethylene.

5. A head as in claim 1 wherein the fabric material is impregnated to elastomerically bond the individual fibers together.

6. A head as in claim 1 wherein the plastic sheet material has a thickness from about 0.005 to about 0.014 inch.

7. A head as in claim 1 wherein the fabric material has a weight from about 1.3 to about 1.6 ounces per square yard.

8. A head as in claim 1 wherein the fabric material distributes the force of impact from an object which strikes the head, thereby reducing deformation of the synthetic plastic sheet material and damping undesirable overtones.

9. A head as in claim 1 wherein an elastomeric high density polyolefin adhesive laminates the plastic sheet material to the fabric material.

10. A head for a drum or similar musical instrument comprising a sheet of a biaxially oriented film of the condensation polymer of ethylene glycol and terephthalic acid laminated to a layer of a high density polyethylene fabric material having random fiber orientation, the biaxially oriented film forming the primary tension load carrier and the polyethylene fabric material distributing load from an object which strikes the surface of the head without transferring stress to the biaxially oriented film and wherein the polyethylene fabric is impregnated to elastomerically bond individual fibers together.

11. A head as in claim 10 wherein the biaxially oriented film has a thickness from about 0.005 to about 0.014 inch.

12. A head as in claim 10 wherein the polyethylene fabric material has a weight from about 1.3 to about 1.6 ounces per square yard.

13. A head as in claim 10 wherein the polyethylene fabric material is impregnated with a water-based emulsion system.

14. A head as in claim 10 wherein an elastomeric high density polyolefin adhesive laminates the biaxially oriented film to the polyethylene fabric material.

15. A head as in claims 9 or 14 wherein the elastomeric high density polyolefin adhesive has a thickness ranging from about 0.001 to about 0.006 inch.

16. A head for a drum or similar musical instrument comprising a sheet having a thickness from about 0.005 to about 0.014 inch of a biaxially oriented film of the condensation polymer of ethylene glycol and terephthalic acid laminated to a layer of a high density polyethylene fabric material having random fiber orientation and having a weight from about 1.3 to about 1.6 ounces per square yard, the biaxially oriented film forming the primary tension load carrier and the polyethylene fabric material distributing load from an object which strikes the surface of the head without transferring stress into the biaxially oriented film, an elastomeric high density polyolefin adhesive having a thickness ranging from about 0.001 to about 0.006 inch laminating the film to the fabric, and the polyethylene fabric material being impregnated to elastomerically bond the individual fibers together.

17. A head for a drum or similar musical instrument comprising a sheet of biaxially oriented film of the condensation polymer of ethylene glycol and terephthalic acid laminated to a layer of a spun bonded olefin fabric material having random fiber orientation, the biaxially oriented film forming the primary tension load carrier and the spun bonded olefin fabric material distributing load from an object which strikes the surface of the head without transferring stress into the biaxially oriented film, said spun bonded olefin fabric material being impregnated to elastomerically bond individual fibers together.

18. A head as in claim 17 wherein the biaxially oriented film has a thickness from about 0.005 to about 0.014 inches.

19. A head as in claim 17 wherein the spun bonded olefin fabric material has a weight from about 1.3 to about 1.6 ounces per square yard.

20. A head as in claim 17 wherein the spun bonded olefin fabric material is impregnated with a water-based emulsion system.

21. A head as in claim 17 wherein an elastromeric high density polyolefin adhesive laminates the biaxially oriented film to the spun bonded olefin fabric material.

22. A head as in claim 21 wherein the elastomeric high density polyolefin adhesive has a thickness ranging from about 0.001 to about 0.006 inch.

* * * * *